J. KENNEDY.
BOLT ANCHOR.
APPLICATION FILED AUG. 20, 1917.
1,352,201. Patented Sept. 7, 1920.
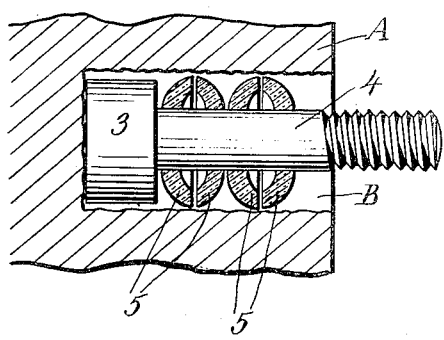
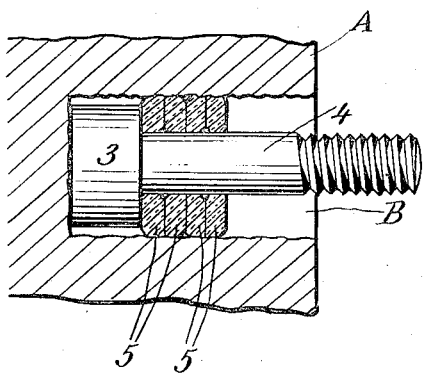
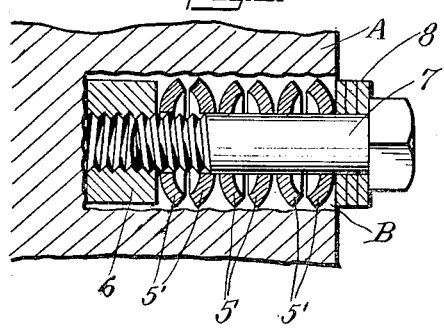
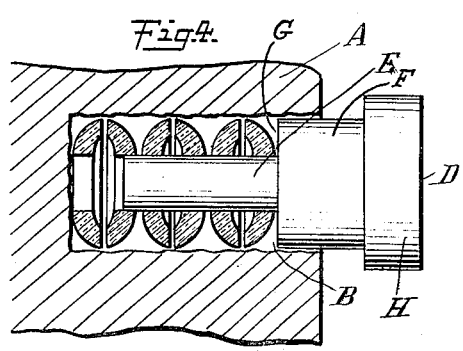
Inventor
Joseph Kennedy
By his Attorneys
Marshall & Dearborn

UNITED STATES PATENT OFFICE.

JOSEPH KENNEDY, OF RICHMOND HILL, NEW YORK, ASSIGNOR, BY MESNE ASSIGNMENTS, TO THE ORSBEE CO., INC., OF NEW YORK, N. Y., A CORPORATION OF NEW YORK.

BOLT-ANCHOR.

1,352,201.

Specification of Letters Patent.

Patented Sept. 7, 1920.

Application filed August 20, 1917. Serial No. 187,066.

*To all whom it may concern:*

Be it known that I, JOSEPH KENNEDY, a citizen of the United States of America, and a resident of Richmond Hill, county of Queens, and State of New York, have invented certain new and useful Improvements in Bolt-Anchors, of which the following is a specification, reference being had to the accompanying drawing, forming a part thereof.

This invention relates to an improved bolt anchor for securing a threaded element as a bolt or other fastening device in an aperture in a wall or other building construction of brick, stone, cementitious material and the like.

One object of this invention is to provide one or more pairs of oppositely disposed transversely bent washers of deformable material in an aperture in such a wall and to expand them outwardly by applying endwise longitudinal pressure thereto in order to increase their diameters by straightening out their curvature to thereby obtain a toggle grip upon the walls of the aperture and obtain a firm and secure anchorage therein.

Another object of the invention is to make such washers of soft ductile material such as lead or alloys of lead and to prevent the inward displacement of the metal of the washers during their outward expansion by inserting a member within them either a bolt or a part of a tool for this purpose. An advantage of the use of soft ductile material lies in the fact of the tenacious hold of the metal upon the roughened surface of the wall of the aperture, and also in the fact that the soft metal readily accommodates itself to all irregularities of shape. My improved device is also extremely practical and cheap to manufacture.

In order that my invention may be thoroughly understood I will now proceed to describe the same in the following specification, and then point out the novel features thereof in appended claims.

Referring to the drawings:

Figure 1 is a longitudinal sectional view of a form of my invention in which several deformable sleeves or transversely bent washers directly coöperate with the shank of a bolt, the parts being shown before expansion.

Fig. 2 is a similar view of the same parts after expansion.

Fig. 3 is a longitudinal elevation of another embodiment of my invention in which the sleeves or washers are arranged to be expanded by the insertion of a bolt into a nut at the bottom of the aperture.

Fig. 4 is a similar view illustrating the manner in which the sleeves or washers may be expanded within the aperture by means of a tool having a portion adapted to fit within the washers and a shoulder fitting the aperture and adapted to be used to apply the expanding longitudinal pressure to the washers.

Like characters of reference designate corresponding parts in all the figures.

In all of the figures A designates a portion of a wall or other building construction, of brick, for instance, and B the hole for the anchor. 5 designates curved or saucer-like washers of deformable metal in that they may be flattened out. Their dimensions are such that when flat they are of slightly greater diameter than that of the aperture, but when curved as shown in Fig. 1, their outer diameter is slightly less than that of the aperture. As shown in this figure their peripheries are so beveled that they are parallel with one another. The head 3 of a bolt 4 is inserted in the anchorage aperture and a plurality of these sleeves or washers 5 of relatively soft material are slipped over the shank of the bolt 4 and adapted to be compressed by means of a suitable tool between the bolt and the sides of the anchorage aperture into the condition illustrated in Fig. 2. It is obvious that this endwise longitudinal pressure may be obtained by screwing a nut onto the threaded end of the bolt.

In flattening and straightening out the cup-shaped washers, the metal of the washers is crowded into the space around the shank of the bolt and against the head of the bolt, so that the bolt is securely gripped and held in the aperture.

In the modification shown in Fig. 3, 6 designates a nut which is first placed in the bottom of the aperture B after which a plurality of deformable transversely bent washers 5' oppositely disposed in pairs, are placed in the hole. In this case the washers are made of a harder deformable metal such as soft steel, annealed iron or brass, and their edges are not beveled. The inward longitudinal pressure required to flatten the washers and thereby outwardly expand them, may be obtained by screwing a bolt 7 into nut 6, interposing, if necessary, a plurality of flat washers 8 between the head of the bolt and the nearest curved washer. With this arrangement a toggle grip is obtained between the bolt and the wall of the aperture which securely locks the bolt 7 in the aperture and forms a solid anchorage therefor.

In Fig. 4 a plurality of curved washers 5 are inserted in the anchorage aperture B oppositely disposed in pairs. These may be outwardly expanded by longitudinal endwise pressure applied by a tool D. This has a body portion E which extends into the holes of the washers and holds them during expansion from moving laterally inwardly, and a neck portion F which fits the aperture and forms at its junction with the body E, a shoulder G, by means of which the inward pressure is applied to the curved washers. The tool may be provided also with a head H to receive hammer blows.

This application is a continuation in part of an application for patent filed by me on the 13th day of August, 1914, and given Serial No. 856,612.

What I claim is:

1. Means for anchoring a member in an aperture in a wall or other body comprising a pair of washers of deformable material in the aperture transversely bent to reduce their external dimension and placed with substantially similar surfaces facing each other, and means for pressing said similar surfaces together by longitudinal pressure to flatten the washers within the aperture to thereby obtain a double toggle grip on the wall of the aperture.

2. Means for anchoring a member in an aperture in a wall or other body comprising a plurality of pairs of washers of deformable material in the aperture, transversely bent to reduce their external dimension and placed with substantially similar surfaces facing each other, and means for pressing said similar surfaces together by longitudinal pressure to flatten the washers within the aperture to thereby obtain at each pair of washers a double toggle grip on the wall of the aperture.

3. Means for anchoring a member in an aperture in a wall or other body comprising a pair of washers of soft deformable metal in the aperture, transversely bent to reduce their external dimension and placed with substantially similar surfaces facing each other, and means for pressing said similar surfaces together by longitudinal pressure to flatten the washers within the aperture to thereby obtain a double toggle grip on the wall of the aperture.

4. Means for anchoring a member having a shank in an aperture of a wall or other body comprising a pair of washers of deformable material in the aperture transversely bent to reduce their external dimension surrounding the shank of the member in said aperture, and placed with substantially similar surfaces facing each other, and means for pressing said similar surfaces together by longitudinal pressure to flatten the washers within the aperture to thereby obtain a double toggle grip between the shank of the element and the wall of the aperture.

In witness whereof, I have hereunto set my hand this 17th day of August, 1917.

JOSEPH KENNEDY.

Witnesses:
I. B. MOORE,
WILLIAM G. DALTON.